(12) United States Patent
Shetty et al.

(10) Patent No.: US 8,204,535 B1
(45) Date of Patent: Jun. 19, 2012

(54) UNIFORM REVERSE-LINK POWER CONTROL FOR AN ACTIVE SET OF A MOBILE STATION

(75) Inventors: Manoj Shetty, Overland Park, KS (US); Sachin R. Vargantwar, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 276 days.

(21) Appl. No.: 12/725,294

(22) Filed: Mar. 16, 2010

(51) Int. Cl.
*H04B 7/00* (2006.01)

(52) U.S. Cl. ....... 455/522; 455/69; 455/524; 455/67.13; 455/220; 370/318

(58) Field of Classification Search .............. 455/69, 455/522, 453, 504, 505, 442, 70, 452.1, 452.2, 455/450, 423, 67.1, 562, 562.1, 524, 67.13, 455/220; 375/244, 205, 146; 370/320, 470, 370/252, 333, 335, 391, 315
See application file for complete search history.

(56) References Cited

U.S. PATENT DOCUMENTS

| | | | |
|---|---|---|---|
| 5,577,022 A | 11/1996 | Padovani et al. | |
| 5,999,522 A | 12/1999 | Rohani | |
| 6,137,994 A * | 10/2000 | Alterman et al. | 455/69 |
| 2002/0167907 A1 * | 11/2002 | Sarkar et al. | 370/252 |
| 2003/0123401 A1 * | 7/2003 | Dean | 370/318 |
| 2004/0047305 A1 * | 3/2004 | Ulupinar | 370/320 |
| 2004/0092233 A1 * | 5/2004 | Rudrapatna | 455/69 |
| 2005/0123059 A1 * | 6/2005 | Harris et al. | 375/244 |
| 2007/0041429 A1 * | 2/2007 | Khandekar | 375/146 |
| 2007/0191044 A1 * | 8/2007 | Kostic et al. | 455/522 |
| 2007/0201377 A1 * | 8/2007 | Santhanam | 370/252 |
| 2010/0056197 A1 * | 3/2010 | Attar et al. | 455/522 |
| 2010/0105407 A1 * | 4/2010 | Demaj et al. | 455/453 |

OTHER PUBLICATIONS

Unpublished U.S. Appl. No. 12/724,650, filed Mar. 16, 2010 entitled "Selective Scanning of the Active Set".
Unpublished U.S. Appl. No. 12/605,457, filed Oct. 26, 2009 entitled "Intelligent Power Control in a Wireless Network".

* cited by examiner

Primary Examiner — Tan Trinh (57) ABSTRACT

Exemplary methods and systems are described that may be employed in a radio access network in order to aggregate the power-control messages from the sectors in a mobile station's active set, and provide an aggregate reverse-link power-control indication, in all active sectors. To do so, an exemplary base station may periodically determine an appropriate reverse-link power adjustment for a mobile station. However, rather than immediately send power-adjustment indications to the mobile station, each base station serving an active sector is preferably configured to send the power-adjustment indication to mobile switching center. The mobile switching center then determines an aggregate power-control indication for the mobile station. The aggregate power-control indication may then be transmitted to the mobile station in each of the mobile station's active sectors.

20 Claims, 3 Drawing Sheets

UNIFORM REVERSE-LINK POWER CONTROL FOR AN ACTIVE SET OF A MOBILE STATION

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Mobile stations operating in such systems may be capable of communication with either or both protocols, and may further be capable of handing off between them, in addition to being able to hand off between various configurations of coverage areas.

In a further aspect, the RAN may be configured to engage in reverse-link power control with mobile station. In general, a base station may monitor indicators such as the frame error rate (FER), and periodically send the mobile station a power-control bit that indicates whether the mobile station should increase or decrease its transmit power. In an IS-2000 system, a base station typically sends a power-control bit sixteen times per frame.

Further, in an IS-2000 system, to control reverse-link transmission power and determine whether the power-control bit should provide a power-up or power-down instruction, the base station may use three different control loops. The first loop is referred to as the "open loop", and is based on the level of power received in the total 1.25 MHz physical channel bandwidth. The second loop is referred to as the "closed" loop, and involves the base station measuring signal strength on the reverse traffic channels to determine if the reverse-link power at the desired level. Then, if reverse-link power is not at the desired level, the base station transmits a one-bit control message (i.e., a power-up or power-down message) to the mobile station at a rate of up to 800 bits/sec on the forward traffic channel. These power-up and power-down message typically adjust the mobile transmit power (i.e., reverse-link power) in steps of approximately 1 dB. The third loop is referred to as the "outer" loop, and involves the base station using reverse-link frame quality statistics (e.g., FER) to monitor the efficacy of the closed loop control. If the FER is above a desired level, the base station uses closed loop power control to instruct the mobile station to increase its transmit power (e.g., by transmitting a power-up message).

OVERVIEW

In CDMA systems, such as those compliant with IS-2000, a mobile station can communicate on a given carrier frequency with a number of "active" sectors concurrently, which collectively make up the mobile station's "active set." Depending on the system, the number of active sectors can be up to six (currently). In practice, the mobile station typically receives largely the same signal from each of its active sectors, and on a frame-by-frame basis, selects the best signal to use.

Since an IS-2000 mobile station communicates with each active sector in its active set concurrently, it is typically sent a power-control bit in each active sector, and considers all the power-control bits when determining whether it should increase or decrease its transmit power. In practice, if the mobile station receives a power-down indication from any sector in its active set, then the mobile station decreases its transmit power. Thus, the mobile station only increases its transmit power if it receives power-up indications from all sectors in its active set.

A potential problem exists if an error occurs and a mobile station does not receive a power-control bit for sector attempting to instruct the MS to power down. In this scenario, if the other sectors in the active set send power-up indications, the MS will incorrectly increase transmit power, when it should have reduced it instead. Accordingly, methods and systems are described herein to, among other benefits, help prevent such errors. In particular, a RAN entity (such as an MSC) may be configured to coordinate power control amongst the sectors in the active, or the BTSs serving the active set may be configured to coordinate amongst themselves, in order to provide a joint reverse-link power-control indication.

In one aspect, an exemplary method may be carried out by a first radio access network (RAN) entity (e.g., a base station). The method may involve (i) the first RAN entity sending a power-control message to a second RAN entity, wherein the power-control message comprises a power-adjustment indication for a mobile station in a first active sector, wherein the first active sector is one of a plurality of active sectors in an active set of the mobile station, and wherein the second RAN entity receives one or more additional power-control messages providing power-adjustment indications for the mobile station in the other active sectors; (ii) the first RAN entity receiving an aggregate power-adjustment indication from the second RAN entity, wherein the aggregate power-adjustment indication is based at least in part on aggregation of all the power-adjustment indications for the mobile station; and (iii) the first RAN entity transmitting the aggregate power-adjustment indication to the mobile station in the first active sector.

In another aspect, an exemplary method may be carried at a radio access network (RAN) entity such as an MSC. The method involves (i) the RAN entity receiving one or more power-control messages associated with a particular mobile station, wherein each power-control message comprises a power-adjustment indication for the mobile station in at least one active sector from an active set of the mobile station, wherein the active set comprises a plurality of active sectors, and wherein one or more base stations serve the active sectors; (ii) the RAN entity using all the received power-adjustment indications for the mobile station as a basis for determining an aggregate power-control indication for the mobile station; and (iii) the first RAN entity sending the aggregate power-control indication to the base stations serving the active set for transmission in each of the active sectors.

Further, each power-adjustment indication may either be a power-up indication or a power-down indication. Therefore, the step of using all the received power-adjustment indications for the mobile station as a basis for determining the aggregate reverse-link power-control indication for the mobile station may involve: (a) if any one of the received power-adjustment indications for the mobile station is a power-down indication, then setting the aggregate power-control indication to be a power-down indication; and (b) otherwise, setting the aggregate power-control indication to be a power-up indication.

In a further aspect, an exemplary system may include: (i) a tangible computer readable medium; and (ii) program instructions stored in the tangible computer readable medium that, when executed by a processor, cause a first radio access network (RAN) entity to: (a) send a power-control message to a second RAN entity, wherein the power-control message comprises a power-adjustment indication for the mobile station in a first active sector, wherein the first active sector is one of a plurality of active sectors in an active set of the mobile station, and wherein the second RAN entity receives one or more additional power-adjustment indications for the mobile station in the other active sectors; (b) receive an aggregate power-adjustment indication from the second RAN entity, wherein the aggregate power-adjustment indication is based at least in part on aggregation of all the power-adjustment indications for the mobile station; and (c) transmit the aggregate power-adjustment indication to the mobile station in the first active sector.

And in a further aspect, an exemplary system may include: (i) a tangible computer readable medium; and (ii) program instructions stored in the tangible computer readable medium that, when executed by a processor, cause a first radio access network (RAN) entity to: (a) receive one or more power-control messages associated with a particular mobile station, wherein each power-control message comprises a power-adjustment indication for the mobile station in at least one active sector from an active set of the mobile station, wherein the active set comprises a plurality of active sectors, and wherein one or more base stations serve the active sectors; (b) use all the received power-adjustment indications for the mobile station as a basis to determine an aggregate power-control indication for the mobile station; and (c) send the aggregate power-control indication to the base stations serving the active set for transmission in each of the active sectors.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
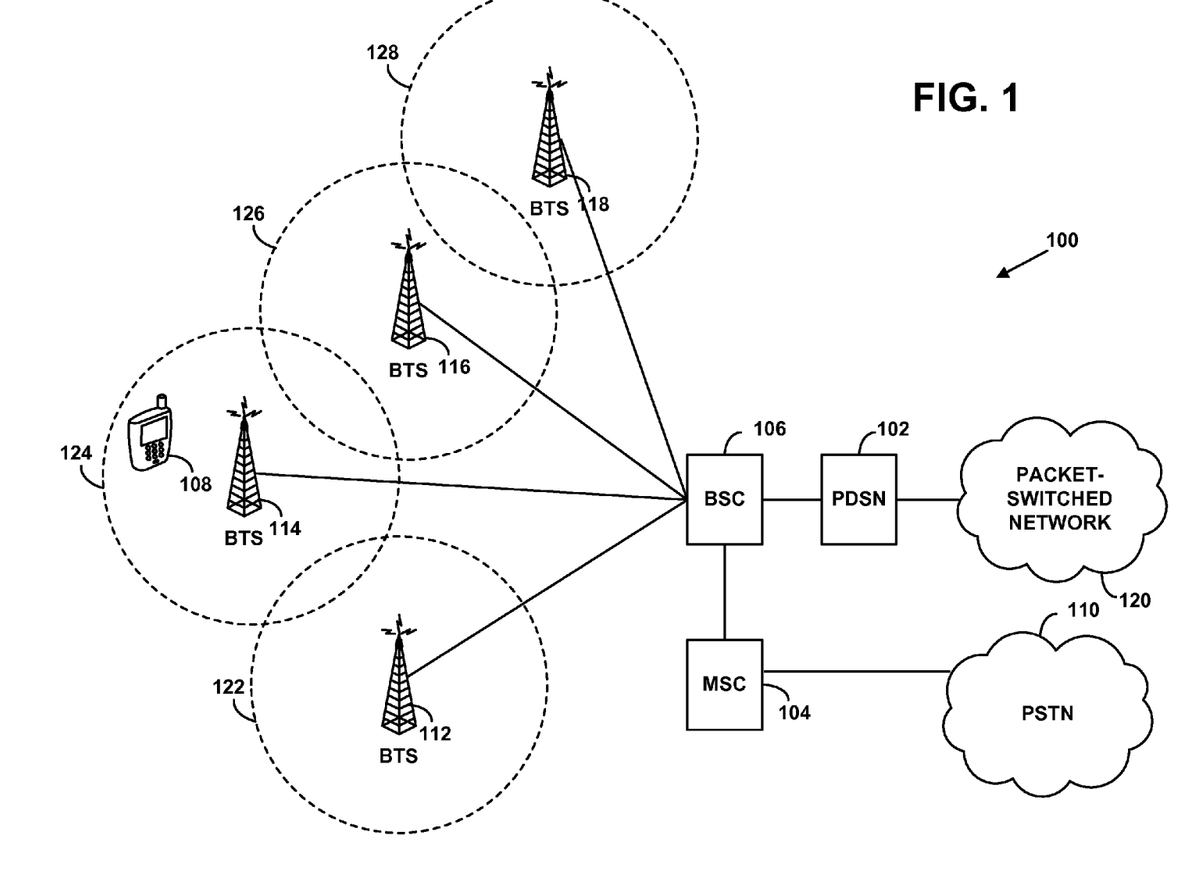
FIG. 1 is a simplified block diagram of a wireless communication system in which an exemplary method and system may be implemented.

Referring to the drawings, FIG. 1 is a simplified block diagram of a wireless communication system 100 in which an exemplary method and system may be implemented. In such a wireless communication system, a wireless carrier typically operates one or more radio access networks (RAN). A RAN typically includes one or more base transceiver stations (BTSs) 112-118 that each serve one or more cell sectors, one or more base station controllers (BSCs) 106 that each control one or more of the BTSs, and one or more switches, such as mobile switching center (MSC) 104, which provide connectivity with other networks. Each BTS 112-118 conventionally includes a cell tower with one or more antennas configured for air-interface communications with a mobile station 108. By way of example, in FIG. 1, BSC 106 and BTSs 112-118 are controlled by MSC 104, which may also provide connectivity with a transport network, such as a public switched telephone network (PSTN) 110.

Communications between the RAN and mobile station 108 may occur in accordance with any air interface protocol now known or later developed. Examples of such protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared. Other protocols may also be employed.

With the illustrated configuration, the RAN may provide service in an area that is divided geographically into a number of cells 122-128, each defined by a radio frequency (RF) radiation pattern from the respective serving BTS 112-118. Furthermore, each cell may be subdivided into a number of sectors. For simplicity, references to a "sector" herein should be understood to include sectors, cells, and possibly other types of coverage areas as well. Accordingly, cells 122-128 may also be referred to as sectors 122-128, and functionality described in reference to BTSs serving a single cell should be understood to apply equally to BTSs serving multiple sectors within a cell.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Air interface communications between mobile station 108 and a BTS 112-118 may be classified as forward link communications, which are those passing from the BTS to the mobile station 108, and reverse link communications, which are those passing from mobile station 108 to the BTS. In an IS-2000 system, both forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Each BTS 112-118 may be any network element arranged to carry out the BTS functions described herein. As such, each BTS may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations such as mobile station 112 over an air interface. The communication interface may also include one or more wired (e.g. Ethernet) and/or wireless (e.g. WiFi or WiMax) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired (e.g. Ethernet) and/or wireless (e.g. WiFi or WiMax) interfaces for communicating with BTSs 112-118, MSC 104 and a packet data serving node (PDSN) 102, which in turn may provide connectivity to a packet-switched network 120, such as the Internet.

MSC 104 may be any networking element arranged to carry out the switch functions described herein. Thus, MSC 104 may include a communication interface, a processor, and data storage comprising instructions executable by the processor to carry out those switch functions. The communication interface may include one or more wired (e.g. Ethernet) and/or wireless (e.g. WiFi or WiMax) interfaces for communicating with at least BSC 106 and a public-switched telephone network (PSTN) 110.

Note that any combination of BTSs 112-118 and/or BSC 106 may be considered a "base station." However, each BTS 112-118 or BSC 106 could, taken alone, each be considered a base station as well. Further, in general, a base station may be considered to include one or more BTSs and possibly a BSC as well. Yet further, a base station may perhaps make use of one or more functions provided by MSC 104, PDSN 102, and/or other network entities.

Referring now to mobile station 108, it may be any mobile device arranged to carry out the mobile-station functions described herein. As examples, mobile station 108 could be or include a cell phone, a PDA, a computer, a laptop computer, a hybrid CDMA/EV-DO device, and/or a multi-mode cellular/Wi-Fi device. As such, a mobile station may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs. Further, while the term "mobile station" is a term of art commonly used for such devices, the term "mobile station" should be understood to include non-mobile devices, such as a personal computer or any other device capable of the functionality of a mobile station described herein.

Under IS-2000, mobile station 108 may be configured to maintain an "active set" of sectors available to the mobile station. For example, under IS-2000, the base station provides the mobile station the following parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The base station also provides the mobile station with a Neighbor List Update Message (NLUM), which identifies the "neighbor" sectors, which are not in the active set, but are identified as candidates for the active set.

The mobile station 108 then scans for all of the pilot signals from the sectors in its active set, and measures the received signal strength for each. For example, mobile station 112 may calculate $E_c/I_o$ for each sector in the active set, where $E_c$ is energy per chip and $I_o$ is the total power received. If the pilot signal strength of any neighbor sector exceeds T_ADD, the mobile station 112 adds the pilot to its "candidate" set and sends a Pilot Strength Measurement Message (PSMM) to the base station with the estimated $E_c/I_o$ for the pilot and information indicative of the identity of the sector. If the pilot strength exceeds any active sector signal by T_COMP, and depending on current capacity and other issues, the base station may then send a Handoff Direction Message (HDM) to the mobile station, listing the pilot as a new member of the active set. Upon receipt of the HDM, the mobile station 108 then adds the pilot to its active set as instructed, and the mobile station sends a Handoff Completion Message (HCM) to the base station (e.g., to BTS 108), acknowledging the instruction, and providing a list of the pilots (PN offsets) in its active set. Depending on system configuration, the mobile station may also identify pilot signals from the remaining set of sectors if they exceed the thresholds.

Similarly, if the mobile station 108 detects that the signal strength of a pilot in its active set drops below T_DROP, the mobile station starts a handoff drop timer. If T_TDROP passes, the mobile station then sends a PSMM to the base station, indicating the $E_c/I_o$ and drop timer. The base station may then respond by sending an HDM to the mobile station, without the pilot in the active set. The mobile station would then receive the HDM and responsively move the pilot to its neighbor set and send an HCM to the base station.

When the mobile station 108 is engaged in IS-2000 communications, mobile station 108 decodes transmissions using all the PN offsets in its active set, together with the respective Walsh codes assigned for each PN-identified sector. Then, on a frame-by-frame basis, the mobile station may select a sector from its active set from which to receive forward-link traffic.

According to an exemplary embodiment, the RAN may be configured to engage in reverse-link power control with mobile station 108, and in particular, to aggregate power-control messages from all the sectors in a mobile station's active set and provide an aggregate reverse-link power-control indication, which may then be transmitted in all sectors of the active set. To do so, each BTS 112-118 may periodically (or possibly on an as-needed basis) determine an appropriate power adjustment for a mobile station. However, rather than immediately send a power-adjustment indication to the mobile station, each BTS 112-118 is preferably configured to instead send the power-adjustment indication to MSC 104. MSC 104 then determines an aggregate power-control indication for the mobile station, which is preferably a power-up indication only if the power-up indications are received in all sectors in the active set. The aggregate power-control indication may then be relayed to the base stations serving the active sectors, and transmitted to the mobile station in each of the active sectors.

Figure 2:
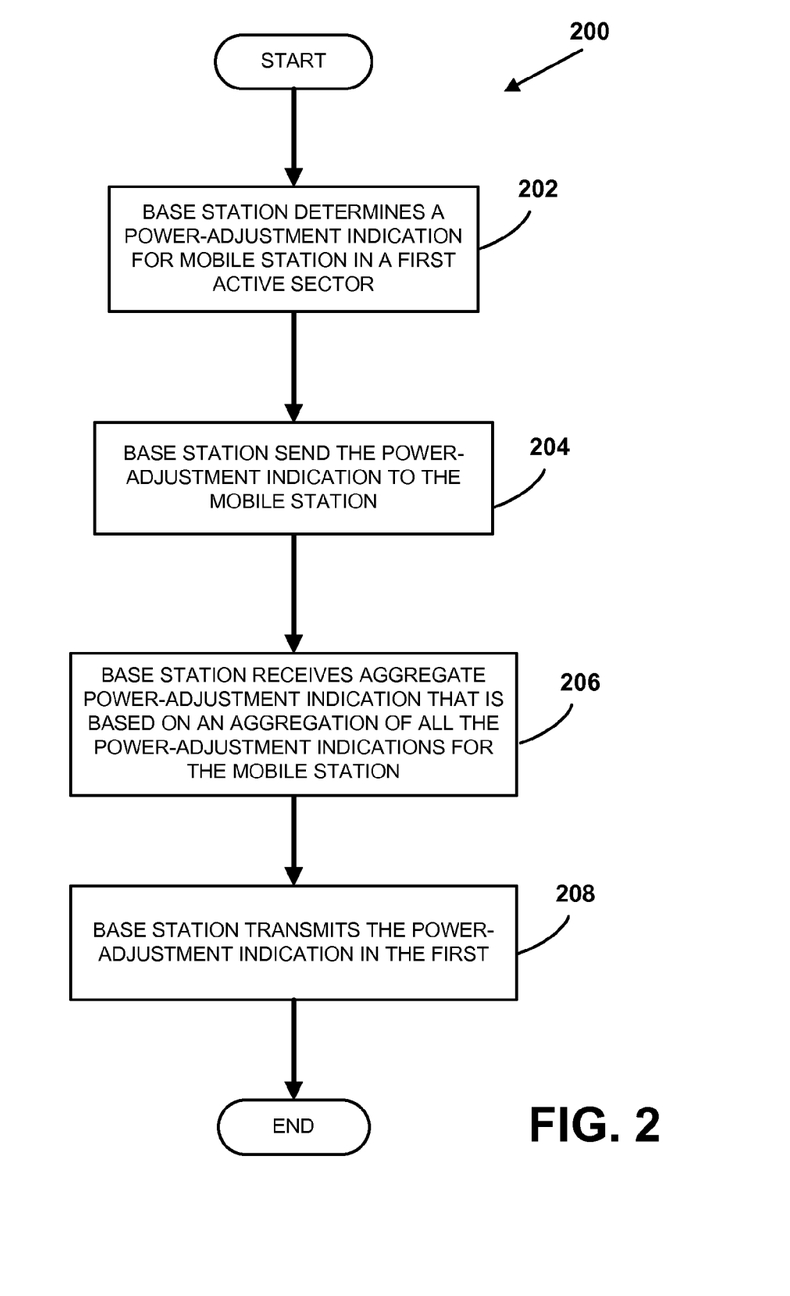
FIG. 2 is flowchart illustrating a method according to an exemplary embodiment.

FIG. 2 is flowchart illustrating a method 200 according to an exemplary embodiment. Method 200 is described by way of example, with reference to a base station carrying out the method in order to provide an aggregate power-adjustment indication to a mobile station. However, it should be understood that method 200 or portions thereof may be carried out by other RAN entities, without departing from the scope of the invention. In practice, method 200 may be implemented in a base station (e.g., a BTS and/or BSC) and/or other RAN entities to help provide an aggregate reverse-link power-control indication for a mobile station, which is then sent in all sectors in the active set. Further, system-wide implementation of an exemplary method, such as method 200, may help coordinate power control across all sectors in a given mobile station's active set, such that each active sector transmits the same power-adjustment indication (i.e., the aggregate power-adjustment indication as determined by the MSC). For example, in an IS-2000 network, the same power-control biSt may be transmitted in each active sector of a given mobile station. Other examples of an aggregate power-adjustment indication, which is uniform in all active sectors, are also possible.

More specifically, method 200 involves a base station, which serves a first active sector of a given mobile station, determining a power-adjustment indication for the mobile station in the active sector, as shown by block 202. The base station does not, however, send the power-adjustment indication to the mobile station. Instead, the base station sends the power-adjustment indication to its associated MSC, as shown by block 204. The power-adjustment indication preferably indicates the mobile station and the sector for which the power-adjustment indication was determined. Responsive to the power-adjustment indication, the base station then receives an aggregate power-adjustment indication from the MSC, as shown by block 206. The aggregate power-adjustment indication indicates a common adjustment (e.g., power up or down) to be sent to the mobile station in all its active sectors. The aggregate power-adjustment indication is based at least in part on an aggregation by the MSC of all the power-adjustment indications for the mobile station (e.g., the power-adjustment indications received from base station the sectors in the mobile station's active set). The base station then transmits the power-adjustment indication in the first active sector (and possibly in additional active sectors, in the event the base station serves multiple active sectors of the mobile station), as shown by block 208.

In an exemplary embodiment of method 200, the power-adjustment indication that is sent to the MSC may be determined in a similar manner as a conventional IS-2000 power-control bit that is sent directly to the mobile station. However, rather than send the power-adjustment indication to the mobile station, the base station includes the power-adjustment indication in a power-control message to the MSC, and waits for the MSC to provide an aggregate power-control bit, which the base station then sends to the mobile station.

Accordingly, the step of the base station determining the power-adjustment indication for the mobile station, as shown in block 202, preferably involves the base station determining whether the mobile station should increase or decrease its power in the active sector. If the base station determines that the mobile station should increase its power, then the determined power-adjustment indication is typically a power-up indication. And, if the base station determines that the mobile station should decrease its power, then the determined power-adjustment indication is typically a power-down indication.

To determine whether the mobile station should increase or decrease its transmission power, the base station may periodically evaluate factors such as the frame error rate (FER), among others. In general, the higher the frame error rate (FER), the lower the quality of service will be, and vice versa. And typically, the higher the transmission power on the link (forward or reverse), the lower the FER will be. Further, it should be understood that the power-adjustment indication may be determined using other techniques, without departing from the scope of the invention.

As noted, each power-control message sent by the base station preferably includes a power-adjustment indication (i.e., a power-up or power-down indication) and an ID for the associated mobile station, to which the aggregate power-adjustment indication will ultimately be sent. In an exemplary embodiment, the power-adjustment indication sent to the MSC may take the form of a power-control bit, which is included in the power-control message. For instance, in the power-control message, the power-control bit may be set to "1" for a power-up indication, or to "0" for a power-down indication. The MSC may then use all of the power-adjustment indications for the mobile station (i.e., the power-adjustment indications received from all active sectors of the mobile station) to determine an aggregate power-adjustment indication for the mobile station.

In a further aspect, each base station may include its base station ID (BS_ID) in its power-control messages, in order that the MSC knows which base stations to respond to with the aggregate power-adjustment indication. Furthermore, other information may additionally or alternatively be included in a power-control message.

In practice, it is possible that one base station may serve more than one active sector of a given mobile station. In this scenario, a base station may determine whether to send the MSC a power-up or power-down indication in various ways. For instance, a base station serving multiple active sectors of a particular mobile station may determine a power-adjustment indication for each active sector it serves, and then send the MSC multiple power-control messages associated with that mobile station (one for each of the mobile station's active sectors that it serves). Alternatively, when a base station serves more than one active sector of the mobile station, the base station may combine multiple power-adjustment indications for the same mobile station, and then send a single power-control message to the BSC. As an example, when a base station determines that the power-adjustment indication for any one of a mobile station's active sectors that it serves is a power-down indication, the base station may include a power-down indication in the power-control message. Thus, the base station will only send the MSC a power-up indication when the power-adjustment indications in all of the mobile station's active sectors that it serves, are all power-up indications. In other words, the base station may aggregate power-adjustment indications for a subset of a given mobile station's active set, in a similar manner as the MSC aggregates the power-adjustment indications for the mobile station's entire active set.

Figure 3:
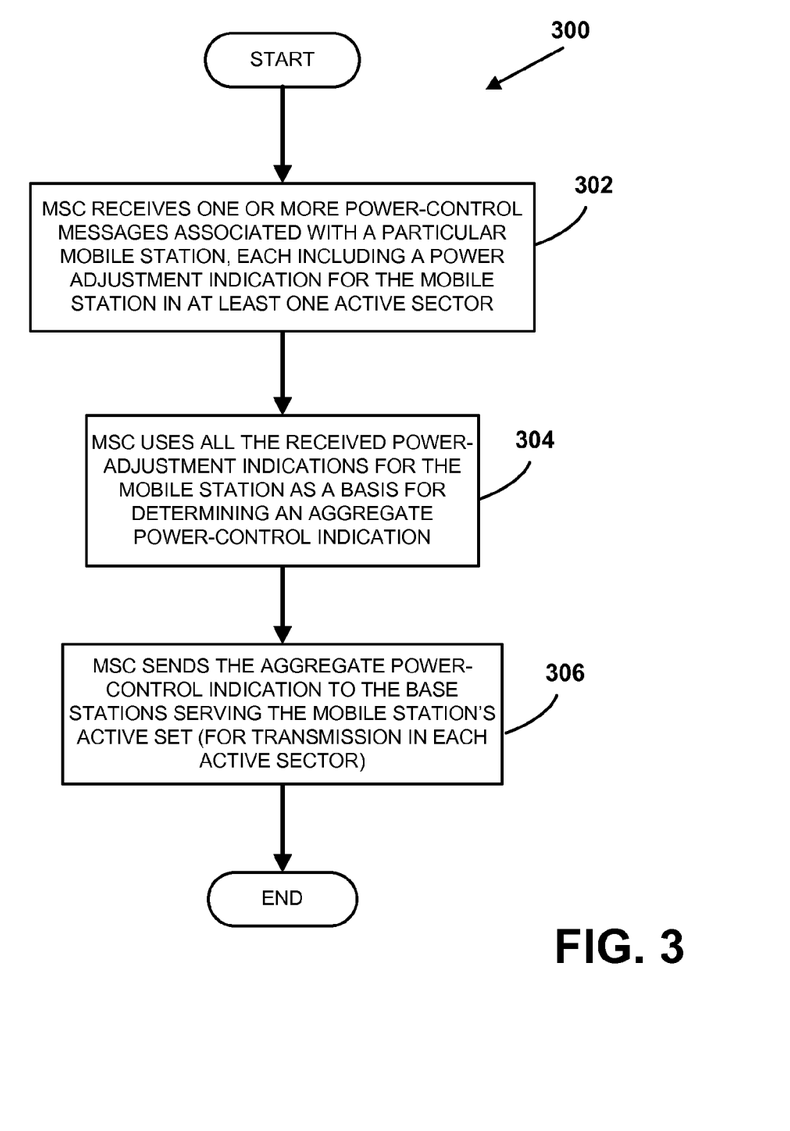
FIG. 3 is another flowchart illustrating a method according to an exemplary embodiment.

FIG. 3 is flowchart illustrating another method 300, according to an exemplary embodiment. Method 300 is described by way of example, with reference to an MSC carrying out the method. However, it should be understood that method 300 or portions thereof may be carried out by other RAN entities, without departing from the scope of the invention. In practice, method 300 may be implemented in an MSC or other RAN entities to help provide a combined reverse-link power-control indication for a mobile station, which is sent in all sectors in the active set.

More specifically, method 300 involves an MSC receiving one or more reverse-link power-control messages associated with a particular mobile station, each including a power-adjustment indication for the mobile station, for at least one active sector from the mobile station's active set, as shown in block 302. As such, the MSC is provided with power-adjustment indications representative of every active sector of the mobile station. The MSC then uses all the power-adjustment indications for the mobile station as a basis for determining an aggregate power-control indication for the mobile station, as shown in block 304. The MSC then sends the aggregate power-control indication to the base stations serving the mobile station's active set for transmission in each active sector, as shown by block 306.

Each received power-control message preferably includes a power-adjustment indication (i.e., a power-up or power-down indication) and an ID for the associated mobile station. In an exemplary embodiment, a power-control message is received for each active sector, and includes a power-adjustment indication for that sector. Therefore, to aggregate the power-adjustment indications for the entire active set of a given mobile station, the MSC may simply aggregate the power-adjustment indications from all the power-control messages it receives that identify the mobile station.

The MSC may aggregate the power-adjustment indications for a mobile station's active set using various techniques. For instance, in an exemplary embodiment, the aggregate power-adjustment indication may take the form of an aggregate power-control bit, which provides a binary indication of whether the mobile station should increase or decrease its transmit power. When the MSC receives a power-down indication for the mobile station in any of the mobile station's active sectors, the MSC may set the power-control bit to "0" (as a power-down indication). Thus, in this embodiment, the MSC only sets the power-control bit to "1" (as a power-up indication) when all the power-control messages received for the mobile station include a power-up indication (indicating that the serving base stations have determined that the mobile station should increase its transmit power in each and every active sector). It should be understood that whether to use "0" as a power-down indication and "1" as a power-up indication, or vice versa, is a matter of engineering design choice. Further, it should be understood that the aggregate power-adjustment indication may take other forms. And yet further, other techniques for deriving an aggregate power-adjustment indication are possible, and may be incorporated as a matter of engineering design choice, without departing from the scope of the invention.

In an alternative embodiment, where a base station initially aggregates a subset of the active set, the MSC may receive a power-adjustment indication that represents an aggregation of the power-adjustment indications for the subset. For example, the MSC may receive a power-adjustment indication that represents an aggregation of the power-adjustment indications for two of a mobile station's six active sectors, which are served by the same base station. As such, this embodiment moves a portion of the aggregation from the MSC to the base station. However, from the MSC's perspective, the MSC may handle a power-adjustment indication for a subset of the active set, in the same manner is it would in an embodiment where there is a one-to-one relationship between the active set and power-control messages (i.e., where one power-adjustment indication is received for each active sector). Accordingly, the MSC may aggregate a power-adjustment indication for a subset of the active set along with all the other power-adjustment indications it receives for a given mobile station.

In another alternative embodiment, for each mobile station for which a power-control message is received, the MSC may identify the active set, such as by using sector IDs of active sectors provided in a recent PSMM from the mobile station. The MSC may then identify and aggregate all power-control messages received for the mobile station, thus aggregating the power-adjustment indications from all active sectors.

To initiate the transmission of the aggregate power-control indication in each sector, the MSC may simply send the aggregate power-control indication to the one or more base stations serving the sectors in the active set. Accordingly, these base stations can then transmit the aggregate power-control indication in all the sectors of the active set. It should be understood that the act of sending, in and of itself, may constitute initiating the transmission of the aggregate power-control indication in all active sector. It is also possible, however, that the transmission of the aggregate power-control indication in all active sectors may be initiated in other ways.

In a further aspect, the MSC may identify the mobile station to which the aggregate power-control indication applies when it sends the aggregate power-adjustment indication to the base stations serving the active set. For example, in an exemplary embodiment, the MSC may send each of the serving base stations an aggregate power-control message that includes the aggregate power-control indication and the associated mobile station ID (MS_ID). Other techniques for providing the aggregate power-control indication to the one or more base stations serving the active set are also possible.

In another aspect, the MSC may eliminate duplicative messaging when a single base station serves more than one active sector of a given mobile station. Accordingly, the method may involve an additional step of the MSC determining which base stations serve which active sectors, and sending only one aggregate power-control message (including at least the aggregate power-adjustment indication) to each of these base stations. Alternatively, the MSC may simply send one aggregate-power-control message for each sector, which may result in a base station serving multiple active sectors, receiving multiple aggregate power-control messages.

In another alternative embodiment, the base stations serving the active set may coordinate amongst themselves to determine an aggregate power-adjustment indication, rather than relying on the MSC to do so. For example, the base station serving an active sector of a given mobile station may identify the other active sectors in the mobile station's active set. The base station may then send a power-adjustment indication, which is associated with the mobile station and the active sector, to each of the other base station or stations serving the other active sectors. Further, the same may be done for all of the mobile station's active sectors, by the respective base station serving each active sector. In this manner, each base station serving an active sector will receive the power-adjustment indications for all the other active sectors. As such, each base station may determine the aggregate power-adjustment indication for the mobile station, which the base station may then send to the mobile station. To implement such an embodiment, a base station may identify the other active sectors using the active-set information provided in the latest PSMM from a mobile station, or using other techniques now known or later developed. Further, the base stations may communicate with each other using various techniques, such as those now known in the art.

Exemplary embodiments may provide an additional benefit when used in conjunction with mobile station configured in a manner disclosed in co-owned U.S. patent application Ser. No. 12/724,650, which is incorporated by reference herein in its entirety. The '650 application discloses methods and systems that may be implemented to help a mobile station save power, by selecting and scanning only a subset of the sectors from the active set. Those sectors in the active set, which are not scanned in certain scenarios, may be referred to as "transparent" sectors. In traditional IS-2000 systems, this may create a scenario where a mobile station would not receive a power-control bit from a transparent sector, and thus might adjust its transmit incorrectly. For instance, the mobile station might incorrectly power up, when a transparent sector sends a power-down indication (which is not detected by the mobile station), and all other active sectors send a power-up indication. However, system-wide implementation of an exemplary embodiment of the present invention may provide uniform reverse-link power control across all active sectors, as all active sectors send the same aggregate power-adjustment indication. The problem of a mobile station missing a power-adjustment indication in a transparent sector may thus be mitigated, as the same power-adjustment indication is sent in the other active sectors.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
a first radio access network (RAN) entity sending a power-control message to a second RAN entity, wherein the power-control message comprises a power-adjustment indication for a mobile station in a first active sector, wherein the first active sector is one of a plurality of active sectors in an active set of the mobile station, and wherein the second RAN entity receives one or more additional power-control messages providing power-adjustment indications for the mobile station in the other active sectors;
the first RAN entity receiving an aggregate power-adjustment indication from the second RAN entity, wherein the aggregate power-adjustment indication is based at least in part on aggregation of all the power-adjustment indications for the mobile station; and
the first RAN entity transmitting the aggregate power-adjustment indication to the mobile station in the first active sector.

2. The method of claim 1, wherein the first RAN entity is a base station and the second RAN entity is a mobile switching center (MSC).

3. The method of claim 2, wherein the base station uses frame error rate (FER) as a basis for determining the power-adjustment indication for the mobile station in the first active sector.

4. The method of claim 1, further comprising the base station initially determining the power-adjustment indication for the mobile station in the first active sector.

5. The method of claim 1, wherein the first RAN entity implements inner loop power control, at least in part, by periodically repeating the method of claim 1.

6. The method of claim 1, wherein the power-adjustment indication comprises a power-control bit, and wherein the aggregate power-adjustment indication comprises an aggregate power-control bit.

7. The method of claim 1, wherein the power-control message comprises at least (a) the power-adjustment indication, (b) a mobile station ID for the mobile station, and (c) a sector ID for the first active sector.

8. The method of claim 1, wherein the first RAN entity serves at least one other active sector from the active set in addition to the first active sector, the method further comprising the first RAN entity sending a separate power-control message to the second RAN entity for each active sector served by the first RAN entity, wherein each power-control message comprises a power-adjustment indication for the mobile station in the respective active sector.

9. The method of claim 1, wherein the first RAN entity serves at least one other active sector from the active set in addition to the first active sector, and wherein the power-adjustment indication for the mobile station in the first active sector comprises an aggregation of the power-adjustment indication for the mobile station in the first active sector and a power-adjustment indication in each of the other active sectors served by the first RAN entity.

10. A method comprising:
a first radio access network (RAN) entity receiving one or more power-control messages associated with a particular mobile station, wherein each power-control message comprises a power-adjustment indication for the mobile station in at least one active sector from an active set of the mobile station, wherein the active set comprises a plurality of active sectors, and wherein one or more base stations serve the active sectors;
the first RAN entity using all the received power-adjustment indications for the mobile station as a basis for determining an aggregate power-control indication for the mobile station; and
the first RAN entity sending the aggregate power-control indication to the base stations serving the active set for transmission in each of the active sectors.

11. The method of claim 10, wherein the first RAN entity is a mobile switching center (MSC).

12. The method of claim 10, wherein each power-adjustment indication comprises either a power-up indication or a power-down indication, and wherein using all the received power-adjustment indications for the mobile station as a basis for determining the aggregate reverse-link power-control indication for the mobile station comprises:
if any one of the received power-adjustment indications for the mobile station is a power-down indication, then setting the aggregate power-control indication to be a power-down indication; and
otherwise, setting the aggregate power-control indication to be a power-up indication.

13. A system comprising:
a tangible computer readable medium; and
program instructions stored in the tangible computer readable medium that, when executed by a processor, cause a first radio access network (RAN) entity to:
    send a power-control message to a second RAN entity, wherein the power-control message comprises a power-adjustment indication for a mobile station in a first active sector, wherein the first active sector is one of a plurality of active sectors in an active set of the mobile station, and wherein the second RAN entity receives one or more additional power-adjustment indications for the mobile station in the other active sectors;
    receive an aggregate power-adjustment indication from the second RAN entity, wherein the aggregate power-adjustment indication is based at least in part on aggregation of all the power-adjustment indications for the mobile station; and
    transmit the aggregate power-adjustment indication to the mobile station in the first active sector.

14. The system of claim 13, wherein the first RAN entity is a base station and the second RAN entity is a mobile switching center (MSC).

15. The system of claim 13, further comprising program instructions stored in the tangible computer readable medium that, when executed by a processor, cause the first RAN entity to:
    initially determine the power-adjustment indication for the mobile station in the first active sector.

16. The system of claim 15, wherein the first RAN entity uses frame error rate (FER) as a basis for determining the power-adjustment indication for the mobile station in the first active sector.

17. The system of claim 13, wherein the power-control message comprises at least (a) the power-adjustment indication, (b) a mobile station ID for the mobile station, and (c) a sector ID for the first active sector.

18. A system comprising:
a tangible computer readable medium; and
program instructions stored in the tangible computer readable medium that, when executed by a processor, cause a first radio access network (RAN) entity to:
    receive one or more power-control messages associated with a particular mobile station, wherein each power-control message comprises a power-adjustment indication for the mobile station in at least one active sector from an active set of the mobile station, wherein the active set comprises a plurality of active sectors, and wherein one or more base stations serve the active sectors;
    use all the received power-adjustment indications for the mobile station as a basis to determine an aggregate power-control indication for the mobile station; and
    send the aggregate power-control indication to the base stations serving the active set for transmission in each of the active sectors.

19. The system of claim 18, wherein the first RAN entity is a mobile switching center.

20. The system of claim 18, wherein each power-adjustment indication comprises either a power-up indication or a power-down indication, and wherein the program instructions stored in the tangible computer readable medium that, when executed by a processor, cause the first RAN entity to use all the received power-adjustment indications for the mobile station as a basis to determine the aggregate power-control indication for the mobile station comprise program instructions stored in the tangible computer readable medium that, when executed by a processor, cause the first RAN entity to:
    if any one of the received power-adjustment indications for the mobile station is a power-down indication, then set the aggregate power-control indication to be a power-down indication; and
    otherwise, set the aggregate power-control indication to be a power-up indication.

\* \* \* \* \*